3,584,992
MODIFICATION OF WOOL WITH PARAFORMAL-
DEHYDE AND CRESOL
Nathan H. Koenig, Albany, Calif., assignor to the United
States of America as represented by the Secretary of
Agriculture
No Drawing. Filed Nov. 19, 1969, Ser. No. 878,203
Int. Cl. D06m *13/16, 13/12, 3/10*
U.S. Cl. 8—127.6      2 Claims

ABSTRACT OF THE DISCLOSURE

Wool fibers are modified through treatment with heated mixtures of cresol and paraformaldehyde.

---

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool. In particular, the invention concerns and has as its prime object the provision of novel processes wherein wool is chemically modified by reacting it with a mixture of paraformaldehyde and cresol. The unqualified term "cresol" used herein includes o-cresol, m-cresol, p-cresol, or any mixture of these isomers. Further objects of the invention will be apparent from the following description wherein parts and percentages are by weight unless otherwise specified.

Although wool is a very useful fiber, it is often desirable to improve its properties for particular applications by chemically modifying it. Various compounds have been proposed for reaction with wool to produce modified fibers. It is known, for example, that wool can be chemically modified by reacting it with aqueous solutions of formaldehyde and various phenols.

I have found that wool can be reacted with a heated mixture of paraformaldehyde and cresol, in the absence of added water, to obtain useful modified wool materials. By virtue of the swelling and catalytic action of cresol, the wool is internally modified by co-reaction with paraformaldehyde and cresol. Cresol has a special action on wool, not found in most organic solvents, as well as the ability to co-react with wool and paraformaldehyde at somewhat elevated temperatures. Because of these special circumstances, the wool can be internally modified with moderately high weight uptakes. These moderately high uptakes confer special improvements on the wool, such as resistance to shrinkage when the treated wool is laundered. Nonetheless, when using this hot mixture of paraformaldehyde and cresol, the wool retains its flexibility at moderately high uptakes. This is in contrast to certain treatments that have been used in the past, such as aqueous solutions of formaldehyde and phenol. In such treatments, unless the uptake is very low, a stiff resin coating is present on the wool. Another special advantage of the present process is that the cresols have high boiling points, namely, 191°, 203°, and 202° C. for the ortho, meta, and para isomers, respectively. As a consequence, it is feasible to conduct the present treatment under atmospheric pressure at temperatures above the boiling point of water and thereby speed up the reaction with wool to make it convenient for a continuous industrial process. Another advantage of the process is that the improvement is essentially perament; the treated materials do not lose their new properties after long use or cleaning but retain these properties for the life of the material.

Carrying out the process of the invention essentially involves contacting wool with a mixture of paraformaldehyde and cresol in the absence of added water; that is, the only water in the system will be that present in the wool. Under normal conditions wool contains about 10–15% moisture. In the event that the wool is dried prior to treatment, the reaction will be essentially anhydrous. Other reaction conditions such as proportion of reagents, temperature, and time may be varied as described below.

The cresol is generally employed in excess over the amount desired to be taken up by the fiber. In fact, sufficient cresol is usually used to completely wet out the wool, thereby achieving a uniform treatment. For this reason, it is preferred to employ the cresol in an amount of at least 100%, based on the weight of the wool. The paraformaldehyde is generally employed in a proportion of about from 10 to 100%, based on the weight of the wool. The ambient temperature may be from 60 to 180° C., the reaction rate increasing with increasing temperature. The degree of modification of the wool is influenced by the proportion of modifying agents taken up by the fiber, that is, the higher the uptake of paraformaldehyde and cresol, the greater will be the degree of modification of the wool. In general, the uptake of paraformaldehyde and cresol may be varied from 1 to 25%. The time of reaction will vary depending on such factors as the proportion of modifying agents, temperature of reaction, and the degree of modification desired. In general, the reaction may take anywhere from a few minutes to a few hours.

After reaction of the wool with the mixture of paraformaldehyde and cresol, the chemically modified wool is treated to remove excess reagents and diluent, if such is used. Thus, the wool may be treated as by wringing, passage through squeeze rolls, centrifugation, or the like. In place of such mechanical action, or in addition thereto, the modified wool product may be extracted with a solvent such as trichloroethylene, benzene, acetone, ethanol, carbontetrachloride, etc. Successive extractions with different solvents may be applied to ensure complete removal of all unreacted materials. The treated wool is then dried in the usual way.

Wool modified in accordance with the invention exhibits advantageous properties over normal wool. For example, the modified wool is more resistant to laundering shrinkage. The tendency of wool to shrink when subjected to washing in aqueous media has long been a deterrent to the more widespread use of wool. An advantage of the invention is that it yields modified wools which have a decreased tendency to shrink when subjected to washing with conventional soap and water or detergent and water formulations.

Improved crease retention is another benefit of this invention. Wool garments are frequently shaped into creases or pleats by heating the garment while it is in a constrained position. However, the fabric shape is temporary and is removed gradually if exposed to humid conditions, or rapidly if soaked. Wool modified according to the present invention shows an improvement in crease retention when in contact with water. Although the creases set in the modified wool are more durable than those in untreated wool, they can be removed completely if one wishes to alter the garment. Removal is accomplished simply by wetting out the creased area and then pressing it flat in a tailor's press.

A still further advantage of the invention is that the modified wool is more resistant to oxidizing conditions. Such conditions may be encountered in textile mills during bleaching, shrinkproofing, or other finishing processes. Oxidizing environments also occur in use by the action of light and air, and in laundering by bleaching chemicals. The increased resistance to acidic oxidation has been shown by the lowered solubility of the modified wool in the peracetic acid-ammonia test described hereinbelow.

Although the properties of the modified wool indicate that actual chemical combination of the wool with the paraformaldehyde and cresol has taken place, it is not known for certain how these chemicals are united with the wool. It is believed, however, that the paraformaldehyde and cresol react with each other and with some of the sites on the wool molecule where there are reactive hydrogen atoms, e.g., amino, imidazoyl, and phenolic groups. Also, combination of the reactants with the wool may establish cross-links in or between the chains of the wool protein molecules that further increase the resistance of the fibers to chemical attack. It may be, however, that other reactions occur and it is not intended to limit the invention to any theoretical basis.

It is to be noted that the reaction in accordance with the invention does not impair the wool fiber for its intended purpose, that is, for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The invention is demonstrated by the following illustrative examples:

EXAMPLE I

Circular samples were cut from undyed wool flannel, 7 oz./sq. yd. The fabric was scoured, leached with ethyl ether followed by ethanol, and conditioned at 21° C. and 65% RH. A fabric sample (1.4 g.) paraformaldehyde (0.5 g.), and m-cresol (6 ml.) were heated in an oven set at 160° C. for 5 minutes. The modified wool was successively extracted with warm acetone and hot ethanol, to remove unreacted reagents, then dried. It was found that the calculated increase in dry weight of the wool, due to its combination with paraformaldehyde and cresol, was 15%.

EXAMPLE II

A circular fabric sample (Example I) was dried at 105° C. for 1 hour. The dried wool (1.3 g.), paraformaldehyde (0.5 g.), and m-cresol (10 ml.) were heated at 105° C. for 60 minutes. The modified wool was extracted as in Example I, and dried. The increase in the weight of the wool as 16%.

The laundering shrinkage of the modified wool, along with a comparison sample of untreated wool, was determined by the following test:

Measured fabric samples were violently agitated in an "Accelorotor" at 1700 r.p.m. for 6 minutes at 40–42° C. with 0.9% sodium oleate solution, using a liquor-to-wool ratio of 40 to 1. After this washing operation, the samples were remeasured to determine the area shrinkage. The improvement in shrinkage properties of wool modified in accordance with the invention is demonstrated by the following data:

| Sample: | Area shrinkage, percent |
|---|---|
| Modified wool | 3 |
| Untreated wool | 50 |

EXAMPLE III

A circular fabric sample (Example I) was dried at 105° C. for 1 hour. The dried wool (1.3 g), paraformaldehyde (0.5 g.), and m-cresol (6 ml.) were heated at 105° C. for 45 minutes. The modified wool was extracted as in Example I, and dried. The increase in the weight of the wool was 23%.

Crease retention of the modified wool, along with a comparison sample of untreated wool, was tested as follows:

The fabrics were folded in half, then steamed and baked in a tailor's press for a total of 2 minutes. Fabric temperatures, measured by thermocouples, were about 235° F. after the 1 minute of steaming and 248° F. after the following 1 minute of baking. The fabrics were then soaked for 3 minutes with occasional stirring, at 40° C. in water containing 0.02% wetting agent. The fabrics were then hung by clips until dry. When inspected, the untreated control sample had no apparent crease while the modified fabric had a very obvious crease.

EXAMPLE IV

A conditioned fabric sample (1.4 g.), prepared as in Example I, paraformaldehyde (0.5 g.), and m-cresol (6 ml.), were heated at 105° C. for 60 minutes. The modified wool was extracted as in Example I, and dried. The increase in weight of the wool was 21%.

The resistance to peracetic acid oxidation of the modified wool, along with a comparison sample of untreated wool, was determined by the following test:

A 0.4-gram sample of cloth is exposed for 24 hours to 100 ml. of 2% peracetic acid. The sample is filtered and then exposed to 100 ml. of 0.3% ammonium hydroxide. The loss in weight of the sample is determined after filtering it and drying it. The results tabulated below show the increased resistance to peracetic acid oxidation of wool modified in accordance with the invention.

| Sample: | Loss in sample weight, percent |
|---|---|
| Modified wool | 17 |
| Untreated wool | 85 |

Having thus described my invention, I claim:
1. A process for modifying wool which comprises:
   reacting wool, in the absence of added water, with a mixture of
   cresol in an amount of at least 100%, based on the weight of the wool, and
   paraformaldehyde in an amount of about 10 to 100%, based on the weight of the wool,
   at a temperature of about 60 to 180° C.
2. The process of claim 1 wherein the reaction is conducted at atmospheric pressure and at a temperature above 100° C.

References Cited

UNITED STATES PATENTS

| 3,332,733 | 7/1967 | Koenig | 8—127.6X |
| 3,388,963 | 6/1968 | Koenig | 8—127.6 |

GEORGE F. LESMES, Primary Examiner

J. CANNON, Assistant Examiner

U.S. Cl. X.R.

8—128, 115.7